United States Patent
Panteleev et al.

(10) Patent No.: US 11,825,560 B2
(45) Date of Patent: Nov. 21, 2023

(54) PHYSICAL SIDELINK FEEDBACK CHANNEL (PSFCH) TRANSMISSION AND RECEPTION IN NEW RADIO (NR) SYSTEMS

(71) Applicant: Intel Corporation, Santa Clara, CA (US)

(72) Inventors: Sergey Panteleev, Nizhny Novgorod (RU); Alexey Khoryaev, Nizhny Novgorod (RU); Mikhail Shilov, Nizhny Novgorod (RU); Kilian Peter Anton Roth, Munich (DE); Sergey Sosnin, Zavolzhie (RU)

(73) Assignee: Intel Corporation, Santa Clara, CA (US)

( * ) Notice: Subject to any disclaimer, the term of this patent is extended or adjusted under 35 U.S.C. 154(b) by 229 days.

(21) Appl. No.: 16/993,064

(22) Filed: Aug. 13, 2020

(65) Prior Publication Data
US 2020/0374978 A1    Nov. 26, 2020

Related U.S. Application Data

(60) Provisional application No. 62/933,060, filed on Nov. 8, 2019, provisional application No. 62/888,183, filed on Aug. 16, 2019.

(51) Int. Cl.
*H04W 72/02* (2009.01)
*H04W 88/04* (2009.01)
(Continued)

(52) U.S. Cl.
CPC .......... *H04W 88/04* (2013.01); *H04L 1/1819* (2013.01); *H04W 72/02* (2013.01);
(Continued)

(58) Field of Classification Search
CPC . H04W 88/04; H04W 72/02; H04W 72/0406; H04W 72/0446; H04W 72/0453;
(Continued)

(56) References Cited

U.S. PATENT DOCUMENTS 11,405,144 B2 *  8/2022  Park ................. H04L 1/1893
2021/0028910 A1 *  1/2021  Cheng ............... H04L 1/1896
(Continued)

OTHER PUBLICATIONS

"3GPP TR 38.885 v2.0.0", 3rd Generation Partnership Project;Technical Specification Group Radio Access Network; NR;Study on Vehicle-to-Everything (Release 16), (Mar. 2019), 122 pgs.

*Primary Examiner* — Ivan O Latorre
*Assistant Examiner* — Malick A Sohrab
(74) *Attorney, Agent, or Firm* — Schwegman Lundberg & Woessner, P.A.

(57) ABSTRACT

An apparatus for use in a UE includes processing circuitry coupled to a memory. To configure the UE for 5G-NR sidelink communications, the processing circuitry is to decode SCI received from a second UE via a PSCCH, the SCI indicating a sidelink resource for transmission of a transport block during multiple transmission time intervals, and a PSFCH indicator. A PSSCH is decoded to obtain the transport block, the PSSCH received in one of the multiple transmission time intervals using frequency resource assignment and time resource assignment of the sidelink resource. HARQ feedback information for the decoded PSSCH is encoded for transmission to the second UE using a PSFCH associated with the sidelink resource, based on the PSFCH indicator and a time gap configured by higher layer signaling.

20 Claims, 7 Drawing Sheets

(51) Int. Cl.
*H04W 72/0446* (2023.01)
*H04W 72/0453* (2023.01)
*H04L 1/1812* (2023.01)
*H04W 72/20* (2023.01)
*H04W 92/18* (2009.01)

(52) U.S. Cl.
CPC ... *H04W 72/0446* (2013.01); *H04W 72/0453* (2013.01); *H04W 72/20* (2023.01); *H04W 92/18* (2013.01)

(58) Field of Classification Search
CPC .... H04W 92/18; H04W 76/14; H04L 1/1819; H04L 2001/0092; H04L 1/1812; H04L 1/1854; H04L 1/1896; H04L 1/1861
See application file for complete search history.

(56) References Cited

U.S. PATENT DOCUMENTS

| | | | |
|---|---|---|---|
| 2021/0400681 A1* | 12/2021 | Wang | H04W 72/0446 |
| 2022/0060286 A1* | 2/2022 | Yoshioka | H04L 1/1854 |
| 2022/0124679 A1* | 4/2022 | Ye | H04W 72/20 |
| 2022/0183092 A1* | 6/2022 | Lee | H04W 72/20 |
| 2022/0201654 A1* | 6/2022 | Lee | H04L 1/1864 |
| 2022/0303955 A1* | 9/2022 | He | H04L 1/1819 |

* cited by examiner

US 11,825,560 B2

PHYSICAL SIDELINK FEEDBACK CHANNEL (PSFCH) TRANSMISSION AND RECEPTION IN NEW RADIO (NR) SYSTEMS

PRIORITY CLAIM

This application claims the benefit of priority to the following provisional applications:

U.S. Provisional Patent Application Ser. No. 62/888,183, filed Aug. 16, 2019, and entitled "VEHICLE-TO-EVERYTHING (V2X) PHYSICAL SIDELINK FEEDBACK CHANNEL TRANSMISSION AND RECEPTION IN NEW RADIO (NR) SYSTEMS"; and U.S. Provisional Patent Application Ser. No. 62/933,060, filed Nov. 8, 2019, and entitled "SYSTEM AND METHOD OF PHYSICAL SIDELINK FEEDBACK CHANNEL TRANSMISSION AND RECEPTION IN NR V2X."

Each of the provisional patent application identified above is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks and 5G-LTE networks such as 5G NR unlicensed spectrum (NR-U) networks. Other aspects are directed to systems and methods for configuring physical sidelink feedback channel (PSFCH) transmission and reception in NR communication systems.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in many disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in the unlicensed spectrum without requiring an "anchor" in the licensed spectrum, called MulteFire. MulteFire combines the performance benefits of LTE technology with the simplicity of Wi-Fi-like deployments.

Further enhanced operation of LTE systems in the licensed as well as unlicensed spectrum is expected in future releases and 5G systems. Such enhanced operations can include techniques for configuring physical sidelink feedback channel (PSFCH) transmission and reception in NR communication systems.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects outlined in the claims encompass all available equivalents of those claims.

Figure 1A:
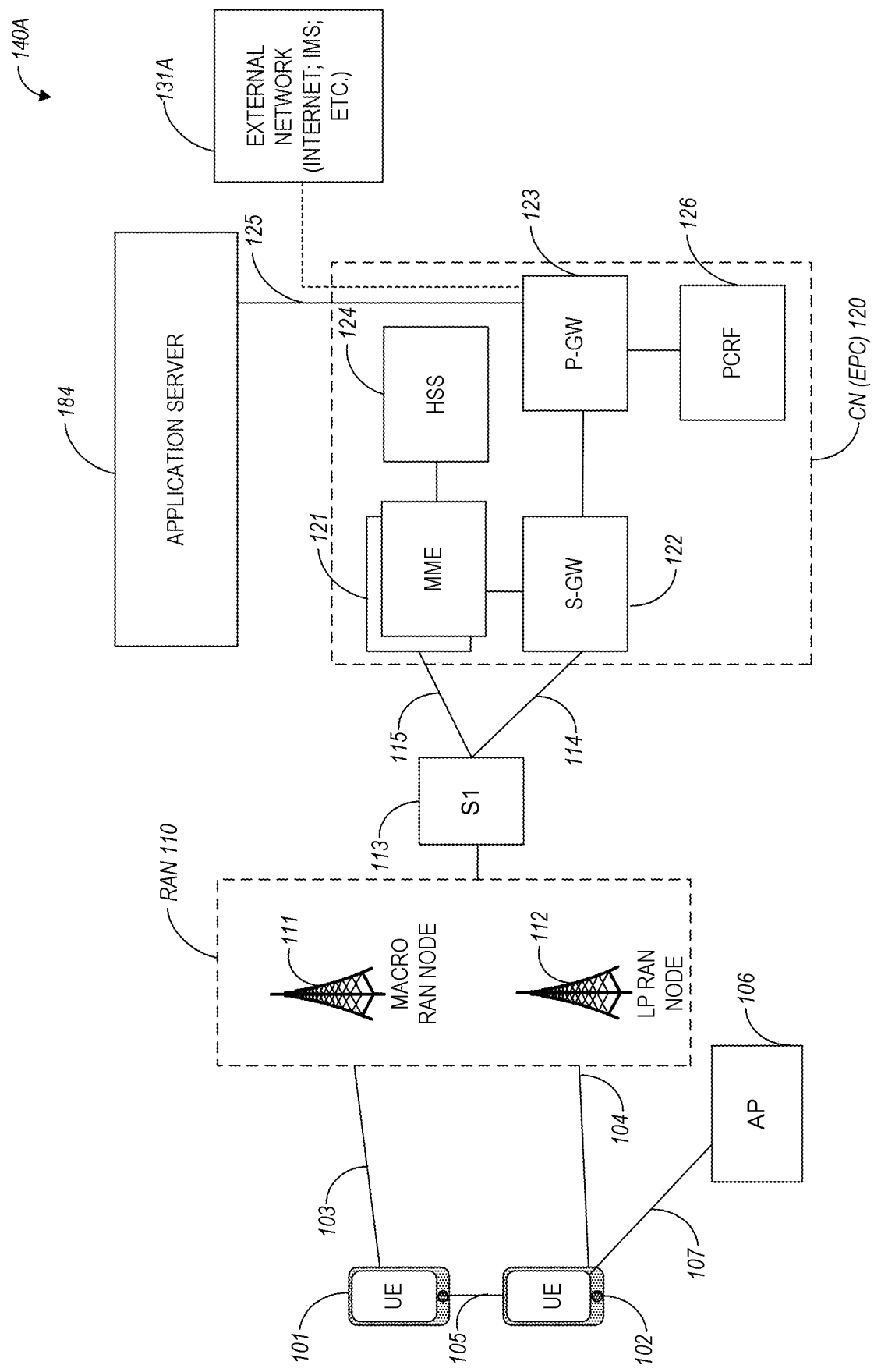
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
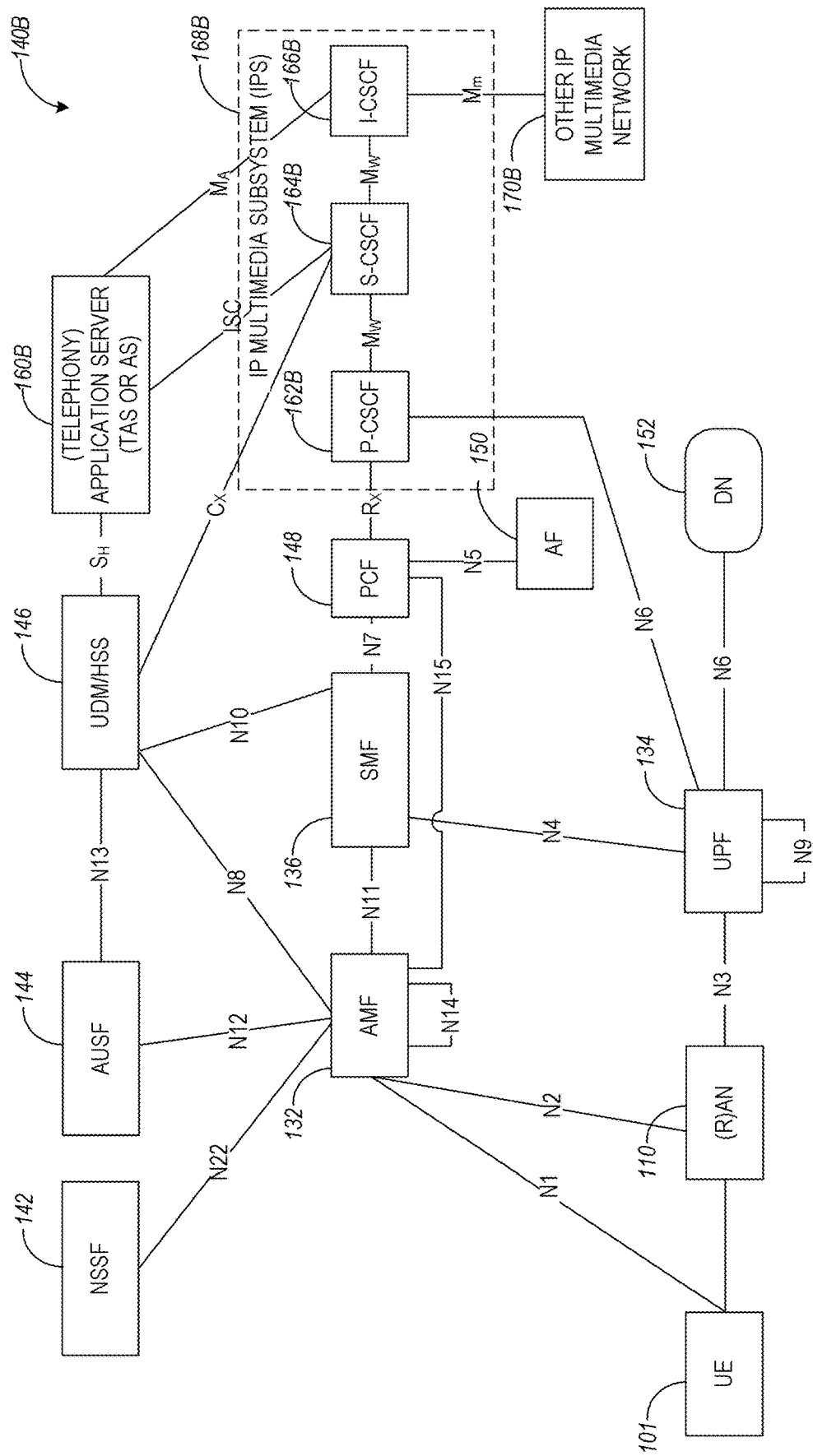
FIG. 1B and FIG. 1C illustrate a non-roaming 5G system architecture in accordance with some aspects.

FIG. 1B illustrates a non-roaming 5G system architecture in accordance with some aspects. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1C:
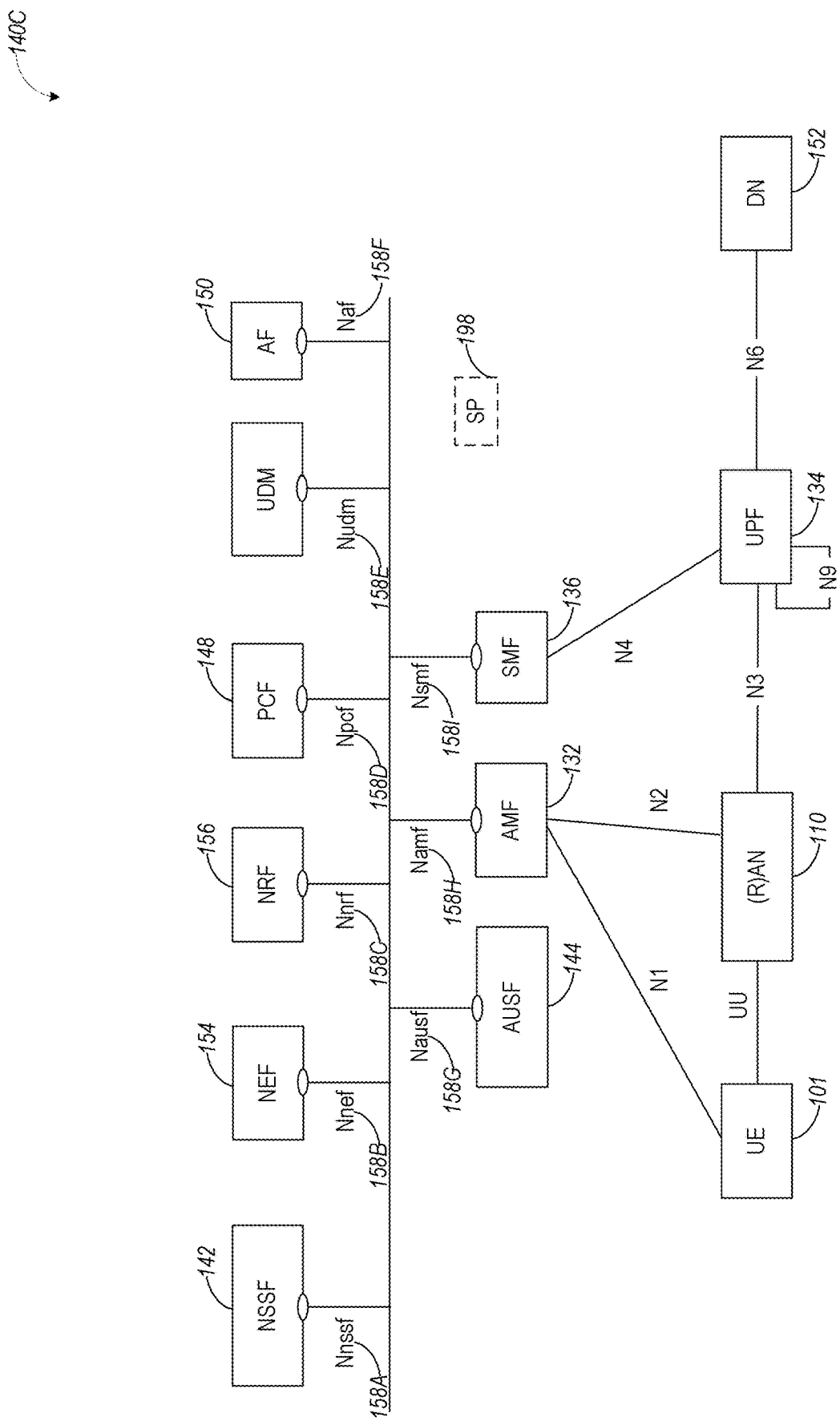

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

In example embodiments, any of the UEs or base stations discussed in connection with FIG. 1A-FIG. 1C can be configured to operate using the techniques discussed in connection with FIG. 2-FIG. 5.

In some aspects, sidelink (SL) of NR-V2X Radio Access Technology (RAT) supports unicast and groupcast transmissions. For SL unicast and groupcast, hybrid automatic repeat request (HARQ) feedback and HARQ combining in the physical layer are supported in NR-V2X to improve the link performance. HARQ-ACK (Acknowledge) or -NACK (Non-Acknowledge) feedback for data transmitted in the Physical Sidelink Shared Channel (PSSCH) may be carried in Sidelink Feedback Control Information (SFCI) format(s) via PSFCH in resource allocation Modes 1 and 2. The PSFCH is a physical channel that is being introduced in the framework of NR-V2X SL design.

The previous solution relied only on repetitions of packets without any HARQ feedback, such as in the SL broadcast of LTE-V2X or also in the IEEE 802.11p based DSRC or ITS-G5 RAT. Other previous solutions rely on using signaling via other air interfaces, for example, via the cellular base station, to provide the feedback. However, the previous solutions did not allow feedback to acknowledge the correct or incorrect reception of the packets or it involved high latency due to the involvement of multiple hops, such as via a base station or access point.

Techniques disclosed herein provide options for the design of the physical structure of PSFCH and its corresponding procedures that are optimized to satisfy constraints and requirements of the NR-V2X SL in Rel. 16 (relative to Rel. 15 NR-DL and UL). As the PSFCH structures and procedures are optimized for the specific purposes of NR-V2X SL, they are naturally more efficient as all the constraints have been taken into account. Thus, a more reliable link with improved performance is established for unicast and groupcast use cases.

PSFCH Time Occasion Determination

In some aspects, the PSFCH is allocated in slot 'n+a' where 'a' is the smallest integer larger than or equal to 'K' with condition that slot 'n+a' contains PSFCH resources. Parameter K is a function of processing time of PSSCH to prepare PSFCH in response.

Figure 2:
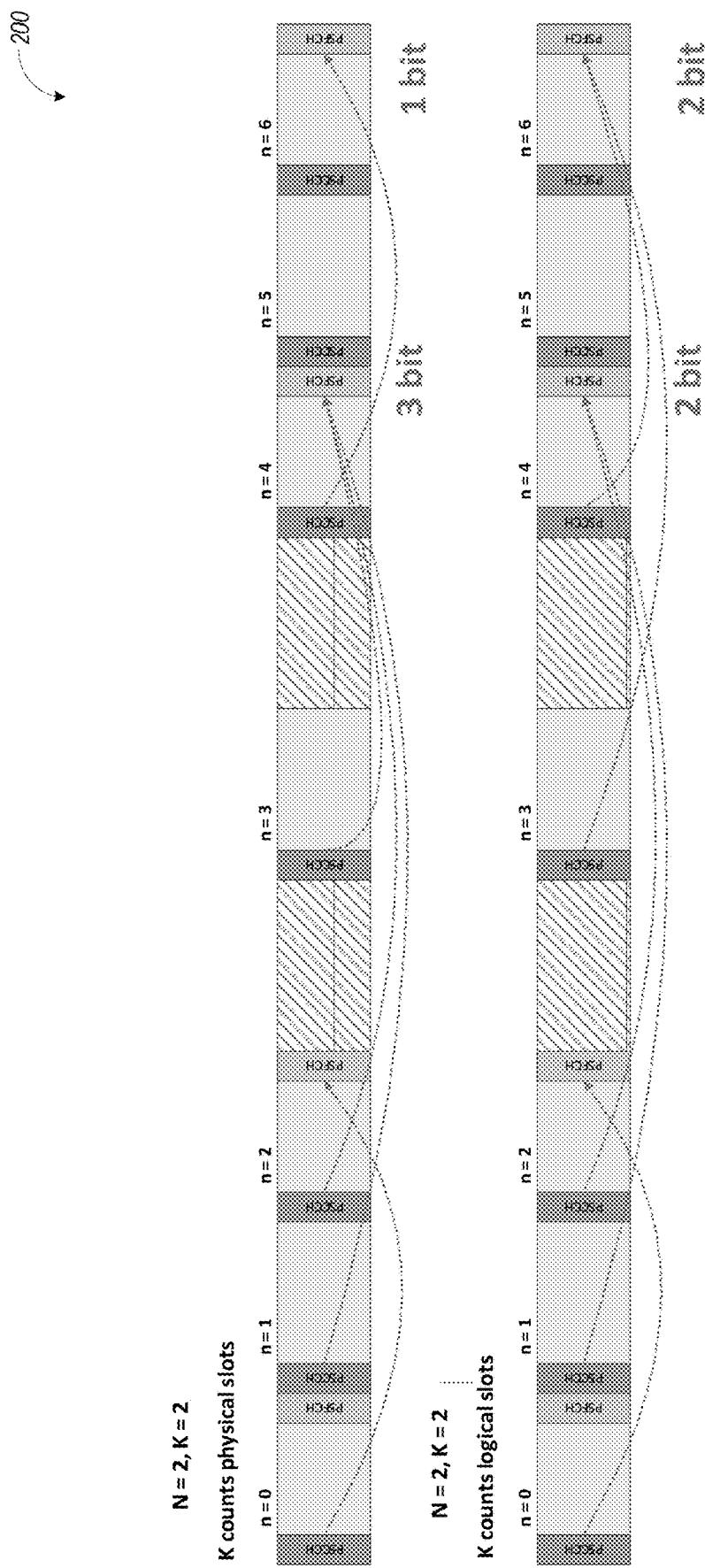
FIG. 2 illustrates physical versus logical slot counting for PSFCH, in accordance with some embodiments.

FIG. 2 illustrates a diagram 200 of physical versus logical slot counting for PSFCH, in accordance with some embodiments.

An open aspect is whether K is measured in logical slots (i.e., slots with available SL symbols or resource pool slots such as slots allocated for SL) or in physical slots (actual slots regardless of whether they can be used for SL). Although the processing time is described in physical symbols/slots, consideration of physical offset may introduce complications into the HARQ-ACK codebook design. Since N period of PSFCH is mapped over SL/resource pool slots, it may be possible that single PSFCH resource needs to carry mode than N HARQ-ACK bits if physical slots are counted by K. This may be resolved if K is counted in logical slots of the resource pool, that provides no more than N HARQ-ACK bit for PSFCH periodicity N. An example of the issue is illustrated in FIG. 2, where assuming N=2, K=2 due to unavailable slots in the resource pool (DL or outside of resource pool), it is possible that a PSFCH needs to convey 3 bit, while logical counting provides no more than 2-bit HARQ-ACK.

In one embodiment, K may be counted from slot 'n' by slots contained in a given SL resource pool where SL transmission is available. For example, a UE can receive a PSSCH based on a resource pool configured by SCI. The SCI can include a HARQ enable indicator. The UE can then provide the HARQ-ACK in a PSFCH transmission where the transmission is in a slot allocated for PSFCH and is after a gap of several slots (e.g., several slots such as K) after the reception of the PSSCH.

Multiplexing of Feedback into One PSFCH

Figure 3:
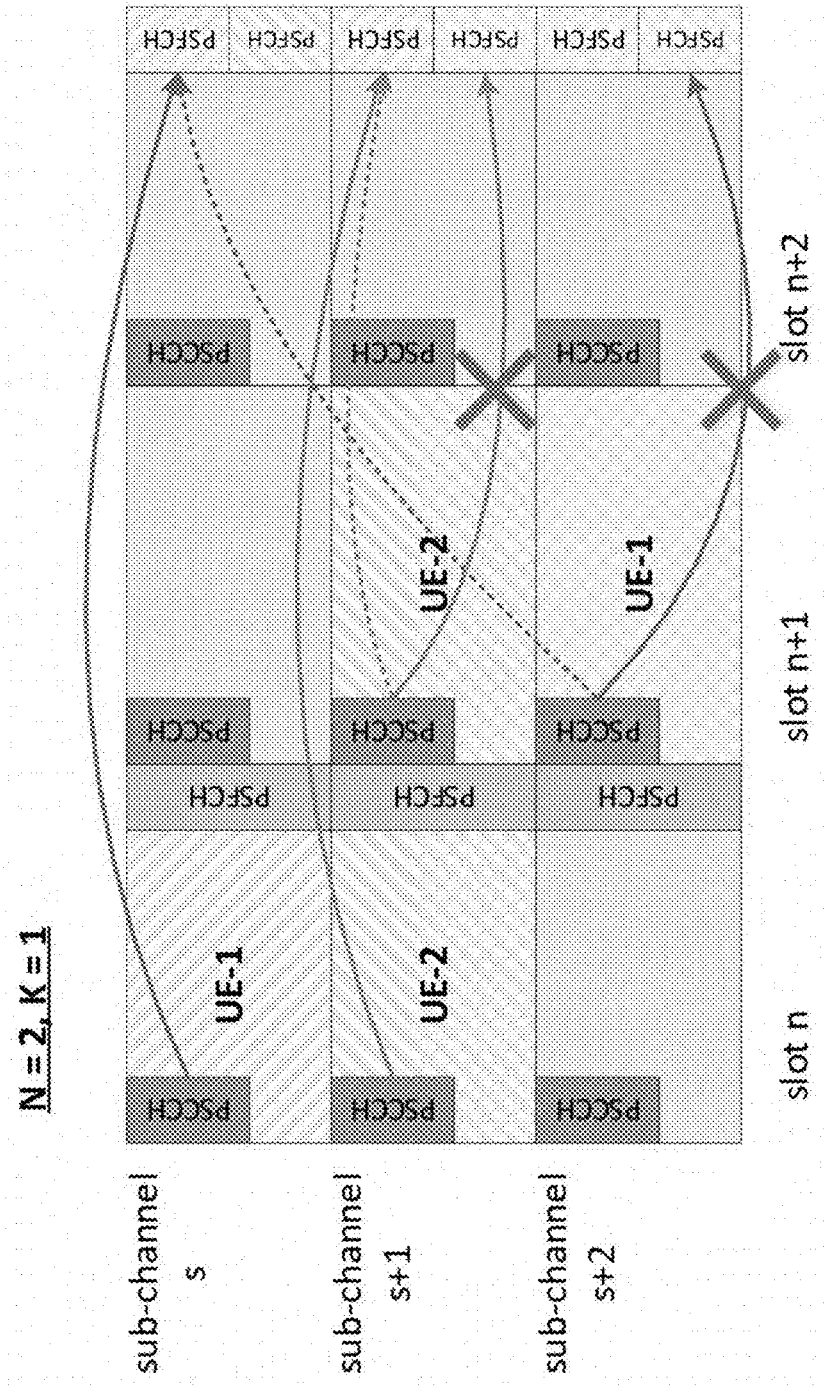
FIG. 3 illustrates PSFCH resource indication due to periodically allocated PSFCH resources, in accordance with some embodiments.

FIG. 3 illustrates a diagram 300 of PSFCH resource indication due to periodically allocated PSFCH resources, in accordance with some embodiments.

Having the PSFCH region every N slots, it may not be possible to rely on 1:1 mapping between PSSCH and PSFCH frequency resources. For example, as illustrated in FIG. 3, as UE-2 chooses to transmit different TBs in the same sub-channel, there is an issue with 1:1 mapping between PSFCH and PSSCH/PSCCH since it leads to two different PSFCH resources. Moreover, when UE-1 chooses to transmit different TBs in different sub-channels, it would cause two PSFCH transmissions from the RX UE in different PSFCH resources of different sub-channels. Therefore, indication in SCI is necessary to multiplex feedbacks from multiple transport blocks in a single PSFCH resource.

Figure 4:
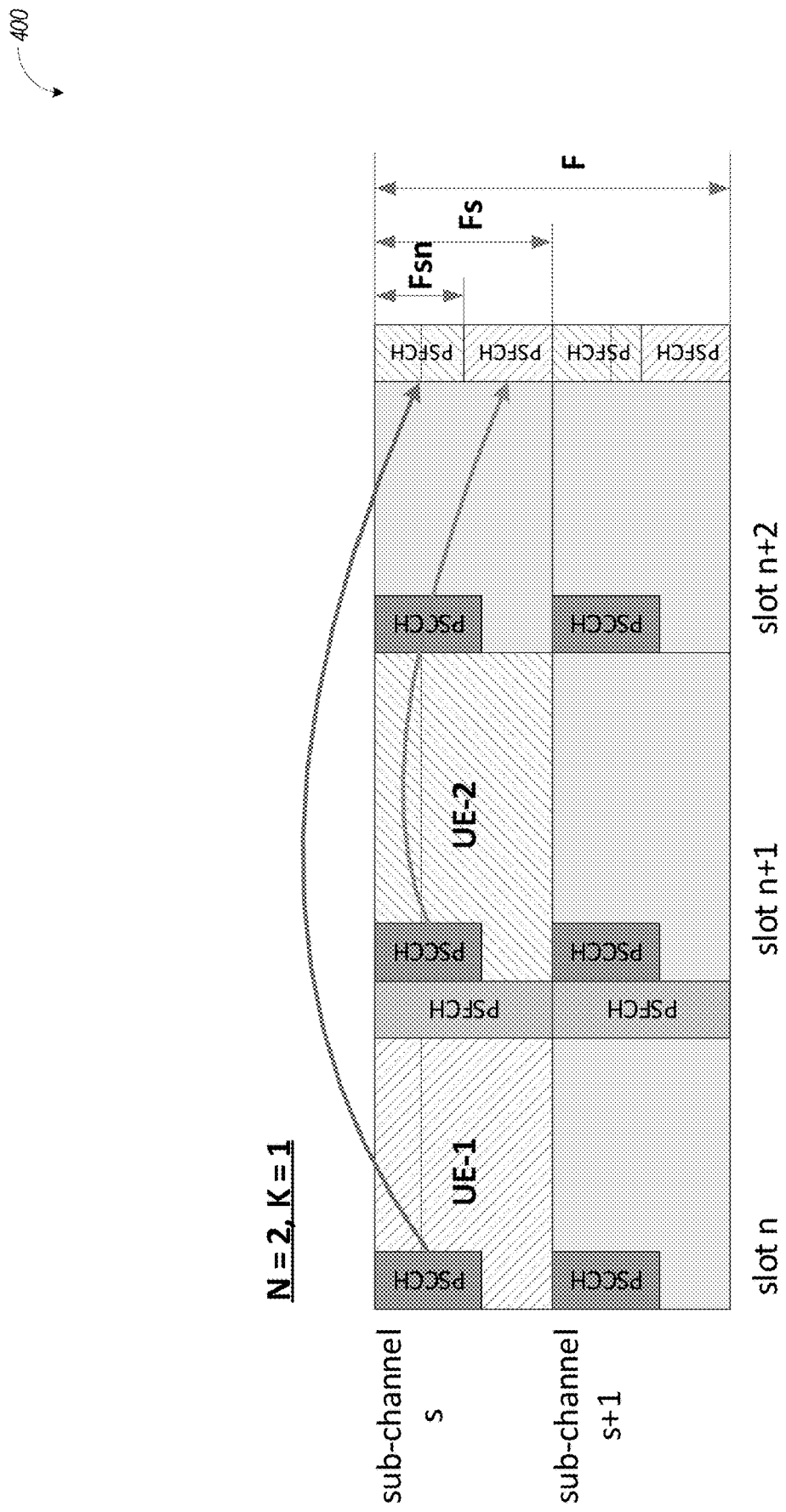
FIG. 4 illustrates the multiplexing of different PSFCH in the same sub-channel, in accordance with some embodiments.

FIG. 4 illustrates a diagram 400 of multiplexing of different PSFCH in the same sub-channel, in accordance with some embodiments. In some aspects, to describe the PSFCH determination rule, the following components of PSFCH resource determination within a PSFCH occasion are considered (as also illustrated in FIG. 4):

S—number of sub-channels in an SL bandwidth part in a carrier; F—a total set of PSFCH frequency resources within a PSFCH time occasion; $N_F$—number of PSFCH resources in F; FS—a set of PSFCH resources associated with a sub-channel 's'; NFs—number of PSFCH resources in Fs; Fsn—a set of PSFCH resources associated with a sub-channel 's' within a slot 'n' of a resource pool; NFsn—number of PSFCH resources in Fsn;

C—number of different code sequences in a PSFCH frequency resource. For example, if computer-generated sequences for NR PUCCH and DMRS for the cases of 12, 18, 24 length are utilized for PSFCH, then C=30, as follows from TS 38.211, tables Table 5.2.2.2-2, 5.2.2.2-3, 5.2.2.2-4.

Fsnc—a set of different frequency-code resources associated with a sub-channel 's' within a slot 'n'; and C×NFsn—number of different frequency-code resources associated with a sub-channel 's' within a slot 'n'.

In some aspects, a 1:1 mapping rule may be defined assuming single TB transmission within PSFCH period and then may be extended to handle collision/multiplexing cases for multiple TBs:

In some aspects, Fs is determined as all PSFCH frequency resources within PRBs used by the sub-channel containing associated PSCCH transmission.

In some aspects, when PSSCH transmission spans more than one sub-channel, only the sub-channel containing PSCCH is taken for PSFCH resource determination. Alternatively, PRBs used by all sub-channels containing associated PSSCH transmission may be used to compose Fs.

In some aspects, when NF is not integer multiple of a number of sub-channels S, two different sizes of Fs may be introduced: floor(NF/S) and ceil(NF/S), where the number of groups of the first size is [N−(NF mod S)], and the number of groups the second size is (NF mod S).

In some aspects, when only a part of a PSFCH resource overlaps with PRBs used by the sub-channel containing the associated PSCCH transmission, either the whole PSFCH resource is included in Fs or the whole PSFCH resource is not included into Fs. In one example, when partial overlap happens in the lowest PRB index of the sub-channel, the PSFCH resource containing this PRB is not included in Fs and when partial overlap happens in the largest PRB index of the sub-channel, the PSFCH resource containing this PRB is included into Fs. In another example, when partial overlap happens in the lowest PRB index of the sub-channel, the PSFCH resource containing this PRB is included in Fs and when partial overlap happens in the largest PRB index of the sub-channel, the PSFCH resource containing this PRB is not included into Fs.

In one example, a set of all PSFCH resources F may be interleaved first before dividing into sub-sets Fs, so that Fs may contain resources from PRBs of different sub-channels. Then, the virtual PRBs of these resources may be used for Fs set determination.

In an example embodiment, Fsn is determined by dividing Fs into N(=PSFCH periodicity) quasi-equal size groups and selecting the group index equal to (n mod N) index where 'n' is the slot index containing the associated PSCCH/PSSCH counted within the associated resource pool. For example, the first number NFs/N resources compose the first group, second number NFs/N resources compose a second group, etc. In some aspects, when NFs is not integer multiple of N, two different sizes of Fsn may be introduced: floor(NFs/N) and ceil(NFs/N), where the number of groups of the first size is [N−(NFs mod N)], and the number of groups the second size is (NFs mod N).

In an example embodiment, frequency resource within Fsn and code resource within C is determined by: for unicast and groupcast Option 1—as a hashing function from L1 source ID; and for groupcast Option 2—as a hashing function from L1 source ID and {UE ID within a group}.

In an example embodiment, if N=1, the sets Fs and Fsn are equal, and there is no need to involve the slot index into the mapping.

If N>1, in a first alternative, a UE may determine Fsn from explicit signaling carried by SCI. The explicit signaling indicates which sub-channel 's' and which slot 'n' is used in the 1:1 mapping rule. The signaling may be derived from a separate field of size ceil(log 2(S*N)). If 's' and 'n' are explicitly signaled in SCI, then the UE should not expect PSFCH resources to be different for different TBs which are being multiplexed, otherwise, due to possibility of missed SCI, there may be ambiguity and efficiency loss since TX UE and RX UE may have a different understanding of PSFCH frequency resource set.

If N>1, in a second alternative, a UE may utilize a hashing from L1 source ID and/or L1 destination ID to determine PSFCH code-frequency resource within a PSFCH occasion. In this case, neither the sub-channel index 's' nor slot index 'n' is used for PSFCH resource determination.

If N>1, in a third alternative, a UE may be restricted to transmit only one TB associated with one HARQ process including one or more than one repetition of this TB. The slot index 'n' and sub-channel index 's' for the 1:1 mapping rule may be determined by the first or the last or a reference repetition of a TB.

Related to the third alternative, it may be combined with the code-block group (CBG) based HARQ feedbacks and retransmissions, where the number of CBGs is equal to N=1, 2, 4 depending on the configured PSFCH periodicity.

The above alternatives may be combined and be a part of UE procedures based on (pre-)configuration using RRC signaling. Moreover, different HARQ feedback generation option may use different approaches, e.g. unicast and groupcast option 2 (where both ACK and NACK can be generated), may apply the first alternative with explicit TB multiplexing signaling. The groupcast option 1 (where NACK only can be generated), may apply the third alternative where single TB can only be sent within N slots of PSFCH period.

In an example embodiment, another 1:1 mapping rule involving slot index 'n', sub-channel index 's', and L1 source and/or L1 destination IDs may be based on the calculation of a decimal number T from a binary representation of concatenation of {'n', 's', 'L1 ID'} and taking i-th PSFCH resource from a set of C*NF PSFCH resources.

In another embodiment, a 1:1 mapping rule may be defined assuming single TB transmission within PSFCH period and then may be extended to handle collision/multiplexing cases for multiple TBs:

Step 1: PSFCH frequency resource group of size L is determined by modulo operation over the set of (pre-)configured PSFCH frequency resources of size NF using a total number of sub-channels S in slots within a PSFCH period N.

In some aspects, the PSFCH frequency resource with index i fulfills the following condition: (i mod S·N)=(s·N+(n mod N)+n_offset) mod S·N, where i=0, . . . , NF−1, n–slot index within resource pool, and n_offset–either 0, or a (pre-)configured value, or a value changed from slot to slot.

In some aspects, if PSCCH is mapped from the lowest PRB of PSSCH, then s—the sub-channel index containing the lowest PSSCH PRB. In some aspects, if PSCCH is mapped from the highest PRB of PSSCH, then s—the sub-channel index containing the highest PSSCH PRB.

Step 2: Frequency resource j within the PSFCH group determined at Step 1 and code resource u within 30 sequences is determined by j=(X LSB of (L1_SRC_ID)+UE_ID_IN_GRP) modulo L, u=(8-X MSB of (L1_SRC_ID)+UE_ID_IN_GRP) modulo 30, where X may be 3 bit or any other value from 1 to 8, and where L is the number of PSFCH frequency resources identified at the first step.

In some aspects, for unicast and groupcast Option 1 UE_ID_IN_GRP=0. In some aspects, for groupcast Option 2 UE_ID_IN_GRP is obtained from higher layer.

Determination of Code-Frequency Resources Used by PSFCH

In some aspects, a hashing function to determine frequency-code resource from a set Fsn may be the following:

To determine the sequence and frequency resource within a set Fsnc, X LSB or MSB (or any other bits) from the L1 ID (or whole source ID) may be taken and modulo operation may be applied so that the index converted from the X bits of L1 ID points to one of C*NFsn code-frequency resources. Other functions may also be used to convert a part or a whole source L1 ID to the base sequence. X here is for example log 2(C*NFsn).

In some aspects, hopping function may be applied to sequence or both sequence and frequency resources. An example of the hopping function based on current PUCCH group hopping from TS 38.211:

The sequence group u=($f_{gh}$+$f_{ss}$) mod 30 and the sequence number v within the group may depend on the higher-layer parameter: In some aspects, if neither group nor sequence hopping is enabled, then $$f_{gh} = 0$$
$$f_{ss} = n_{ID} \bmod 30$$
$$v = 0,$$

where $n_{ID}$ may be given by the hashing function described earlier.

In some aspects, if group hopping is enabled, then $$f_{gh} = \left(\sum_{m=0}^{7} 2^m c\left(8\left(2n_{s,f}^{\mu} + n_{hop}\right) + m\right)\right) \bmod 30$$
$$f_{ss} = n_{ID} \bmod 30$$
$$v = 0,$$

where the pseudo-random sequence c(i) is defined by [TS 38.211 clause 5.2.1] and shall be initialized at the beginning of each radio frame with $c_{init}=\lfloor n_{ID}/30 \rfloor$ where $n_{ID}$ may be given by the hashing function described earlier.

In some aspects, if group hopping is disabled, then $$f_{gh} = 0$$
$$f_{ss} = n_{ID} \bmod 30$$
$$v = c(2n_{s,f}^{\mu} + n_{hop}),$$

where the pseudo-random sequence c(i) is defined by [TS 38.211 clause 5.2.1] and shall be initialized at the beginning of each radio frame with $c_{init}=2^5 \lfloor n_{ID}/30 \rfloor + (n_{ID} \bmod 30)$ where $n_{ID}$ may be given by the hashing function described earlier The frequency hopping index $n_{hop}$=0 if intra-slot frequency hopping is disabled. If frequency hopping is enabled, $n_{hop}$=0 for the first hop and $n_{hop}$=1 for the second hop.

In one example, the procedure described above for sequence hopping may be applied to frequency-sequence hopping by substituting '30' with 'C*NFsn' and interpreting $n_{ID}$ over the whole set of sequence-frequency resources.

Handling of Potential Collisions Cases

In addition to the implicit and explicit resource determination rules, the following collision cases may be addressed using disclosed techniques:

Case 1—PSFCH TX/RX overlap;
Case 2—PSFCH TX to multiple UEs; and
Case 3—PSFCH TX with multiple HARQ feedback to the same UE.

In some aspects, Case 3 in cellular systems may be handled by multiplexing using HARQ-ACK codebooks, so that the dropping of HARQ bits is avoided. A similar approach may be used in NR V2X, i.e., the multiple feedbacks to the same UE may be multiplexed.

Case 1:

Transmission and reception in the same PSFCH occasion may be first of all avoided by proper resource selection, when known occasions of PSFCH and associated PSSCH may be excluded from resource selection.

Alternatively, if PSFCH TX/RX is already scheduled, the following can be considered:

Priority may be used to decide which PSFCH to transmit or receive. When the same priority is associated with transmission and reception, other tie-breaking criteria can be applied:

Option 1: When operating in groupcast option 1 (NACK only), the missed sending of NACK may be dangerous since it is then interpreted as ACK. Thus, it is not appropriate to always prioritize RX over TX in tie-breaking cases. Always prioritize TX over RX in tie-breaking cases may be acceptable since a UE may consider to automatically retransmit the unacknowledged data at expense of some efficiency loss.

Option 2: Priority offset for TX may be added, when comparing with RX, so that equal priority means TX is prioritized.

Option 3: RSRP measured on the links for TX and RX of PSFCH may be used. PSFCH associated with the highest or with lowest RSRP value may be selected for TX or RX.

Option 4: UE implementation may handle these cases.

Option 5: If NACK transmission is pending, it may be prioritized over PSFCH reception, while NACK may be assumed on non-received PSFCHs.

Option 6: If ACK transmission is pending, it may be prioritized over PSFCH reception, while NACK may be assumed on non-received PSFCHs.

In some aspects, TX over RX regardless of priority may be applied as the simplest solution. In some aspects, UE implementation may handle collision cases.

Case 2:

In this case, it may be difficult to avoid such collisions by resource selection. Therefore, only dropping rules can be used. One way is to use priority values to decide which PSFCH to transmit. When the same priority is associated with multiple transmissions, other criteria can be applied:

Option 1: As discussed in the context of Case 1, if among the pending PSFCH transmissions there is one following groupcast Option 1, it is better to select the groupcast NACK-only transmission due to ACK assumption when it is not transmitted. When there are multiple such feedbacks, it may be up to UE which one to transmit.

Option 2: RSRP measured on the links for TX of PSFCH may be used. PSFCH associated with the highest or with lowest RSRP value may be selected for TX.

Option 3: UE implementation may handle these cases.

Option 4: If NACK transmission is pending, it may be prioritized over ACK transmission.

Option 5: ACK may be prioritized over NACK when operating in ACK/NACK mode, since transmitter may further detect DTX and retransmit.

Out of Order Operation

In some aspects, SCI carries the HARQ feedback request flag. That allows a mix of blind and feedback-based retransmissions for any TB. In that case, it is important to clarify the following aspects:

PSSCH resource being acknowledged: In some aspects, PSFCH is to be sent in response to PSSCH which is scheduled by SCI carrying the feedback request, and not the PSSCH being reserved in the future.

In-order or out-of-order operation: In some aspects, in Uu, it is not allowed to schedule retransmission for a TB before the feedback for the same TB due to UE implementation complications as well as HARQ procedure complications. The same principle may be applied in SL.

In one embodiment, for HARQ feedback in groupcast and unicast, when PSFCH resource is (pre-)configured in the resource pool:

A mix of blind and feedback-based retransmissions is up to UE implementation, subject to the total count of the maximum number of (re-) transmissions;

From RX UE perspective (implying TX UE behavior): a UE may not be expected to receive an SCI scheduling a TB before the moment of transmission/generation of requested HARQ feedback for the same TB by a prior SCI; and From the TX UE perspective: a UE may not be expected to transmit SCI scheduling a TB before the moment of transmission/generation of requested HARQ feedback for the same TB by a prior SCI.

In some aspects, a system and method of enhanced sidelink physical feedback channel transmission and reception use one or more of: selection, by a UE, of PSFCH time occasion; selection, by a UE, of a set of PSFCH frequency resources; selection, by a UE, of particular PSFCH frequency resource; and selection, by a UE, of sequence for PSFCH mapping.

In some aspects, the PSFCH is allocated in slot 'n+a' where 'a' is the smallest integer larger than or equal to 'K' with condition that slot 'n+a' contains PSFCH resources, and K may be counted from slot 'n' by slots contained in a given SL resource pool where SL transmission is available.

In some aspects, S—number of sub-channels in an SL bandwidth part in a carrier; F—a total set of PSFCH frequency resources within a PSFCH time occasion; NF—number of PSFCH resources in F; Fs—a set of PSFCH resources associated with a sub-channel 's'; NFs—number of PSFCH resources in Fs; Fsn—a set of PSFCH resources associated with a sub-channel 's' within a slot 'n' of a resource pool; NFsn—number of PSFCH resources in Fsn; C—number of different code sequences in a PSFCH frequency resource; Fsnc—a set of different frequency-code resources associated with a sub-channel 's' within a slot 'n'; C×NFsn—number of different frequency-code resources associated with a sub-channel 's' within a slot 'n'.

In some aspects, Fs is determined as all PSFCH frequency resources within PRBs used by the sub-channel containing associated PSCCH transmission.

In some aspects, Fsn is determined by dividing Fs into N (=PSFCH periodicity) quasi-equal size groups and selecting the group index equal to (n mod N) index where 'n' is the slot index containing the associated PSCCH/PSSCH counted within the associated resource pool.

In some aspects, frequency resource within Fsn and code resource within C is determined by: for unicast and groupcast Option 1—as a hashing function from L1 source ID; and for groupcast Option 2—as a hashing function from L1 source ID and {UE ID within a group}.

In some aspects, a UE may determine Fsn from explicit signaling carried by SCI. The explicit signaling indicates which sub-channel 's' and which slot 'n' is used in the 1:1 mapping rule. The signaling may be derived from a separate field of size ceil(log 2(S*N)).

In some aspects, a UE may utilize a hashing from L1 source ID and/or L1 destination ID to determine PSFCH code-frequency resources within a PSFCH occasion.

In some aspects, a UE may be restricted to transmit only one TB associated with one HARQ process including one or more than one repetition of this TB.

In some aspects, to determine the sequence and frequency resource within a set Fsnc, X LSB or MSB (or any other bits) from the L1 ID (or whole source ID) may be taken and modulo operation may be applied so that the index converted from the X bits of L1 ID points to one of C*NFsn code-frequency resources.

In some aspects, a hopping function may be applied to sequence or both sequence and frequency resources.

Figure 5:
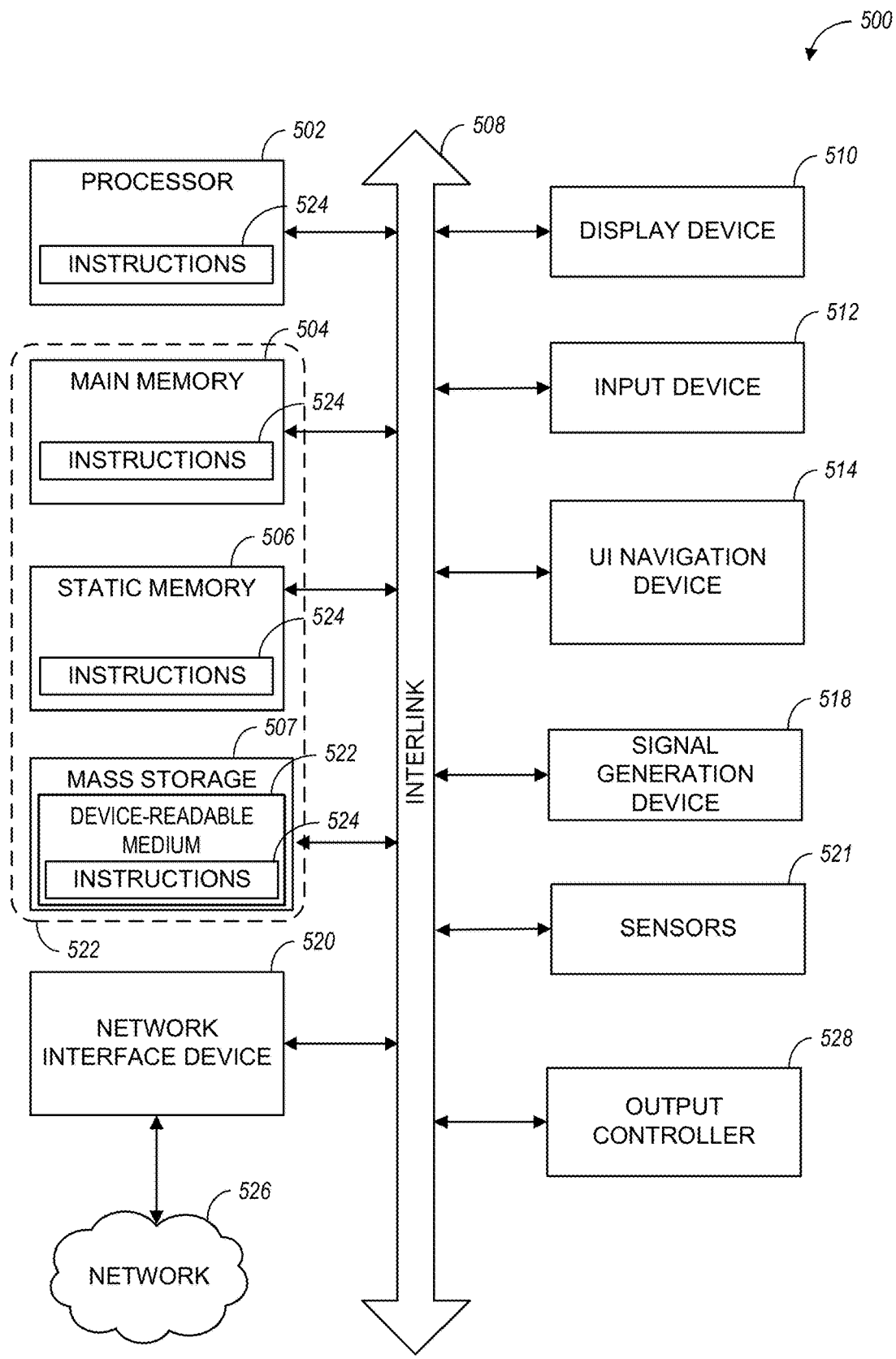
FIG. 5 illustrates a block diagram of a communication device such as an evolved Node-B (eNB), a new generation Node-B (gNB), an access point (AP), a wireless station (STA), a mobile station (MS), or user equipment (UE), in accordance with some aspects.

FIG. 5 illustrates a block diagram of a communication device such as an evolved Node-B (eNB), a next generation Node-B (gNB), an access point (AP), a wireless station (STA), a mobile station (MS), or user equipment (UE), in accordance with some aspects and to perform one or more of the techniques disclosed herein. In alternative aspects, the communication device 500 may operate as a standalone device or may be connected (e.g., networked) to other communication devices.

Circuitry (e.g., processing circuitry) is a collection of circuits implemented in tangible entities of the device 500 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 500 follow.

In some aspects, the device 500 may operate as a standalone device or may be connected (e.g., networked) to other devices. In a networked deployment, the communication device 500 may operate in the capacity of a server communication device, a client communication device, or both in server-client network environments. In an example, the communication device 500 may act as a peer communication device in peer-to-peer (P2P) (or other distributed) network environment. The communication device 500 may be a UE, eNB, PC, a tablet PC, an STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

The communication device (e.g., UE) 500 may include a hardware processor 502 (e.g., a central processing unit (CPU), a graphics processing unit (GPU), a hardware processor core, or any combination thereof), a main memory 504, a static memory 506, and mass storage 507 (e.g., hard drive, tape drive, flash storage, or other block or storage devices), some or all of which may communicate with each other via an interlink (e.g., bus) 508.

The communication device 500 may further include a display device 510, an alphanumeric input device 512 (e.g., a keyboard), and a user interface (UI) navigation device 514 (e.g., a mouse). In an example, the display device 510, input device 512, and UI navigation device 514 may be a touch-screen display. The communication device 500 may additionally include a signal generation device 518 (e.g., a speaker), a network interface device 520, and one or more sensors 521, such as a global positioning system (GPS) sensor, compass, accelerometer, or another sensor. The communication device 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 507 may include a communication device-readable medium 522, on which is stored one or more sets of data structures or instructions 524 (e.g., software) embodying or utilized by any one or more of the techniques or functions described herein. In some aspects, registers of the processor 502, the main memory 504, the static memory 506, and/or the mass storage 507 may be, or include (completely or at least partially), the device-readable medium 522, on which is stored the one or more sets of data structures or instructions 524, embodying or utilized by any one or more of the techniques or functions described herein. In an example, one or any combination of the hardware processor 502, the main memory 504, the static memory 506, or the mass storage 516 may constitute the device-readable medium 522.

As used herein, the term "device-readable medium" is interchangeable with "computer-readable medium" or "machine-readable medium". While the communication device-readable medium 522 is illustrated as a single medium, the term "communication device-readable medium" may include a single medium or multiple media (e.g., a centralized or distributed database, and/or associated caches and servers) configured to store the one or more instructions 524. The term "communication device-readable medium" is inclusive of the terms "machine-readable medium" or "computer-readable medium", and may include any medium that is capable of storing, encoding, or carrying instructions (e.g., instructions 524) for execution by the communication device 500 and that cause the communication device 500 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 524 may further be transmitted or received over a communications network 526 using a transmission medium via the network interface device 520 utilizing any one of a number of transfer protocols. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input-multiple-output (SIMO), MIMO, or multiple-input-single-output (MISO) techniques. In some examples, the network interface device 520 may wirelessly communicate using Multiple User MIMO techniques.

The term "transmission medium" shall be taken to include any intangible medium that is capable of storing, encoding or carrying instructions for execution by the communication device 500, and includes digital or analog communications signals or another intangible medium to facilitate communication of such software. In this regard, a transmission medium in the context of this disclosure is a device-readable medium.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus to be used in a user equipment (UE), the apparatus comprising:
   processing circuitry, wherein to configure the UE for Fifth Generation-New Radio (5G-NR) sidelink communications, the processing circuitry is to:
      decode configuration signaling indicating configurations of a resource pool, the resource pool comprising a plurality of slots being for:
         a transmission of a physical sidelink shared channel (PSSCH) or a reception of the PSSCH on a sidelink (SL) BWP; and
         a transmission or reception of a physical sidelink feedback channel (PSFCH) on the SL BWP;
      decode sidelink control information (SCI) received from a second UE via a physical sidelink control channel (PSCCH), the SCI being separate from the configuration signaling and indicating a sidelink resource of the resource pool for transmission of a transport block via the PSSCH, and a hybrid automatic repeat request (HARQ) feedback indicator enabling or disabling HARQ feedback information;
      decode the PSSCH to obtain the transport block, the PSSCH received using a frequency resource assignment and a time resource assignment associated with the sidelink resource; and
      encode the HARQ feedback information associated with the decoded PSSCH for transmission to the second UE using the PSFCH associated with the sidelink resource, based on the HARQ feedback indicator,
      wherein the UE transmits the PSFCH with the HARQ feedback information in a first slot of the plurality of slots that includes PSFCH resources of the resource pool and is a number of slots after a last slot of the plurality of slots forming the resource pool used for reception of the PSSCH, the number of slots based on the configuration signaling indicating the configurations of the resource pool; and
   a memory coupled to the processing circuitry and configured to store the SCI.

2. The apparatus of claim 1, wherein the 5G-NR sidelink communications comprise vehicle-to-everything (V2X) communications, and wherein the processing circuitry is to:
      decode a second PSFCH with second HARQ information received from the second UE, wherein reception of the second PSFCH overlaps in time with transmission of the PSFCH.

3. The apparatus of claim 2, wherein the processing circuitry is to:
      encode the PSFCH for transmission or decode the second PSFCH received from the second UE based on a priority value associated with each of the PSFCH and the second PSFCH.

4. The apparatus of claim 1, wherein the HARQ feedback indicator is an enable indicator or a disable indicator for transmission of the HARQ feedback information.

5. The apparatus of claim 4, wherein the processing circuitry is to encode the HARQ feedback information for transmission when the HARQ feedback indicator is the enable indicator.

6. The apparatus of claim 4, wherein the processing circuitry is to refrain from encoding the HARQ feedback information for transmission when the HARQ feedback indicator is the disable indicator.

7. The apparatus of claim 1, wherein the configuration signaling further indicates a periodicity of transmitting the HARQ feedback information via the PSFCH.

8. The apparatus of claim 7, wherein the processing circuitry is to:
      determine a frequency resource of the PSFCH resources based on the periodicity; and
      encode the HARQ feedback information associated with the decoded PSSCH for transmission to the second UE using the PSFCH and the determined frequency resource.

9. The apparatus of claim 1, further comprising transceiver circuitry coupled to the processing circuitry; and, one or more antennas coupled to the transceiver circuitry.

10. A non-transitory computer-readable storage medium that stores instructions for execution by one or more processors of a user equipment (UE), the instructions to configure the UE for Fifth Generation-New Radio (5G-NR) sidelink communications, and to cause the UE to:
      decode configuration signaling indicating configurations of a resource pool, the resource pool comprising a plurality of slots being for:
      a transmission of a physical sidelink shared channel (PSSCH) or a reception of the PSSCH on a sidelink (SL) BWP; and
      a transmission or reception of a physical sidelink feedback channel (PSFCH) on the SL BWP;
      decode sidelink control information (SCI) received from a second UE via a physical sidelink control channel (PSCCH), the SCI being separate from the configuration signaling and indicating a sidelink resource of the resource pool for transmission of a transport block via the PSSCH, and a hybrid automatic repeat request (HARQ) feedback indicator enabling or disabling HARQ feedback information;
      decode the PSSCH to obtain the transport block, the PSSCH received using a frequency resource assignment and a time resource assignment associated with the sidelink resource; and
      encode the HARQ feedback information associated with the decoded PSSCH for transmission to the second UE using the PSFCH associated with the sidelink resource, based on the HARQ feedback indicator,
      wherein the UE transmits the PSFCH with the HARQ feedback information in a first slot of the plurality of slots that includes PSFCH resources of the resource pool and is a number of slots after a last slot of the plurality of slots forming the resource pool used for reception of the PSSCH, the number of slots based on the configuration signaling indicating the configurations of the resource pool.

11. The non-transitory computer-readable storage medium of claim 10, wherein the 5G-NR sidelink communications comprise vehicle-to-everything (V2X) communications, and wherein executing the instructions further causes the UE to:
decode a second PSFCH with second HARQ information received from the second UE, wherein reception of the second PSFCH overlaps in time with transmission of the PSFCH.

12. The non-transitory computer-readable storage medium of claim 11, wherein executing the instructions further causes the UE to:
encode the PSFCH for transmission or decode the second PSFCH received from the second UE based on a priority value associated with each of the PSFCH and the second PSFCH.

13. The non-transitory computer-readable storage medium of claim 10, wherein the HARQ feedback indicator is an enable indicator or a disable indicator for transmission of the HARQ feedback information.

14. The non-transitory computer-readable storage medium of claim 13, wherein executing the instructions further causes the UE to:
encode the HARQ feedback information for transmission when the HARQ feedback indicator is the enable indicator.

15. The non-transitory computer-readable storage medium of claim 13, wherein executing the instructions further causes the UE to:
refrain from encoding the HARQ feedback information for transmission when the HARQ feedback indicator is the disable indicator.

16. The non-transitory computer-readable storage medium of claim 10, wherein the configuration signaling further indicates a periodicity of transmitting the HARQ feedback information via the PSFCH.

17. The non-transitory computer-readable storage medium of claim 16, wherein executing the instructions further causes the UE to:
determine a frequency resource of the PSFCH resources based on the periodicity; and
encode the HARQ feedback information associated with the decoded PSSCH for transmission to the second UE using the PSFCH and the determined frequency resource.

18. An apparatus to be used in a user equipment (UE), the apparatus comprising:
processing circuitry, wherein to configure the UE for Fifth Generation-New Radio (5G-NR) sidelink communications, the processing circuitry is to:
decode sidelink control information (SCI) received from a second UE via a physical sidelink control channel (PSCCH), the SCI indicating a sidelink resource of a resource pool for transmission of a transport block via a physical sidelink shared channel (PSSCH), and a hybrid automatic repeat request (HARQ) feedback indicator enabling or disabling HARQ feedback information;
decode the PSSCH to obtain the transport block, the PSSCH received using a frequency resource assignment and a time resource assignment associated with the sidelink resource; and
encode the HARQ feedback information associated with the decoded PSSCH for transmission to the second UE using a physical sidelink feedback channel (PSFCH) associated with the sidelink resource, based on the HARQ feedback indicator,
wherein the UE transmits the PSFCH with the HARQ feedback information in a first slot of a plurality of slots forming the resource pool, the first slot including PSFCH resources of the resource pool and is a number of slots after a last slot of the plurality of slots of the resource pool used for reception of the PSSCH, the number of slots based on decoding configuration signaling indicating configurations of the resource pool, the SCI being separate from the configuration signaling; and
a memory coupled to the processing circuitry and configured to store the SCI.

19. The apparatus of claim 18, wherein the processing circuitry is to:
decode a second PSFCH with second HARQ information received from the second UE, wherein reception of the second PSFCH overlaps in time with transmission of the PSFCH.

20. The apparatus of claim 19, wherein the processing circuitry is to:
encode the PSFCH for transmission or decode the second PSFCH received from the second UE based on a priority value associated with each of the PSFCH and the second PSFCH.

* * * * *